UNITED STATES PATENT OFFICE.

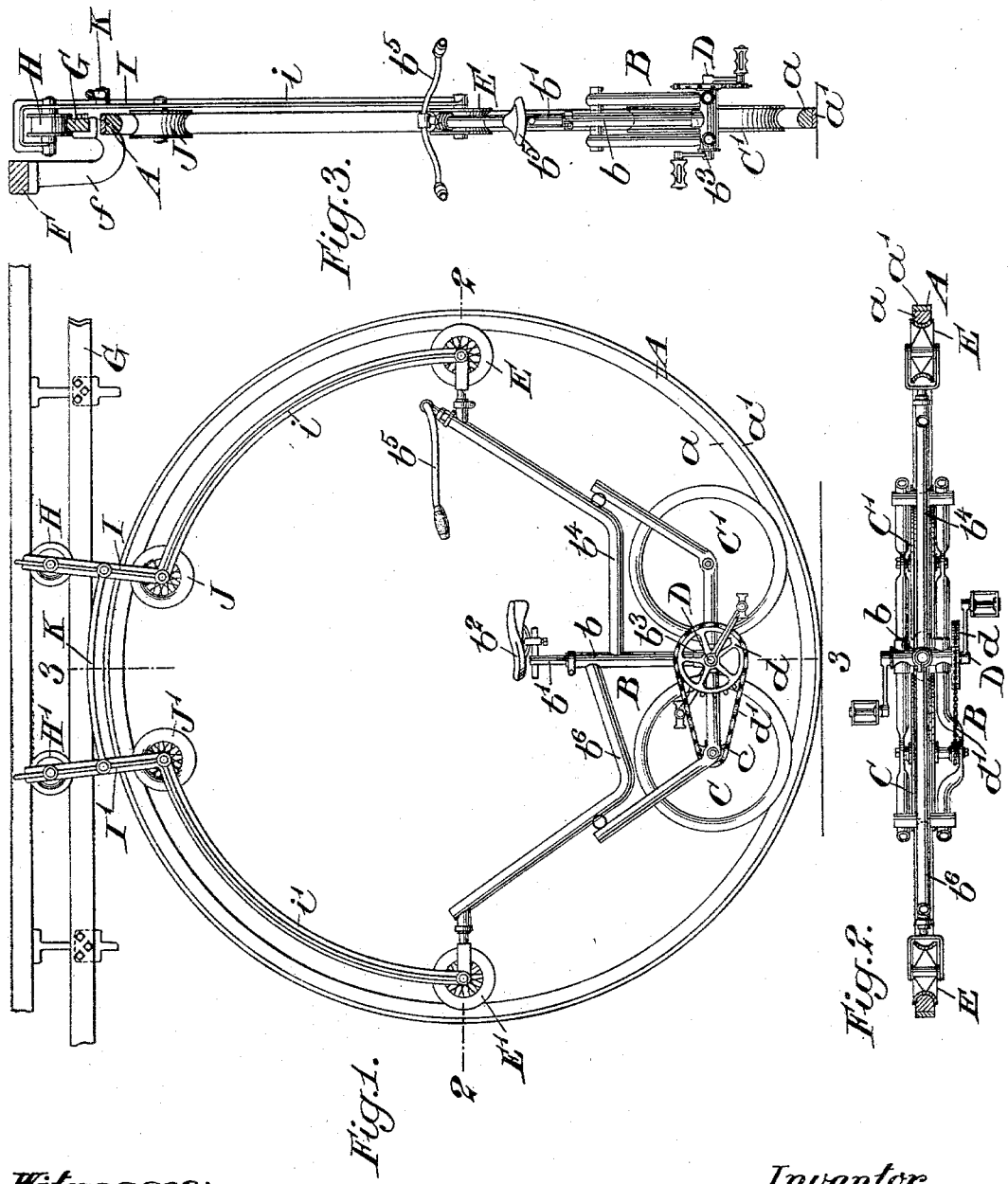

SAMUEL E. FRENCH, OF NEW YORK, N. Y.

CYCLE.

SPECIFICATION forming part of Letters Patent No. 597,843, dated January 25, 1898.

Application filed May 27, 1897. Serial No. 638,363. (No model.)

*To all whom it may concern:*

Be it known that I, SAMUEL E. FRENCH, of New York, in the county and State of New York, have invented a new and useful Improvement in Cycles, of which the following is a specification.

My invention relates to an improvement in cycles in which the two wheels of a bicycle are caused to engage the inner wall of a large traction-wheel and travel along the same as one of the wheels of a bicycle is driven, whereby the traction-wheel is driven, the said traction-wheel being guided in its forward or backward movements by means of an overhead hanger.

The object of my invention is to provide a cycle of the above character which will be very strong and in which a bicycle and its supporting parts may be readily removed from or engaged with the traction-wheel.

A practical embodiment of my invention is represented in the accompanying drawings, in which—

Figure 1 is a side view of the cycle. Fig. 2 is a horizontal central section in the plane of the line 2 2 of Fig. 1, the saddle being removed from the cycle to show more clearly the parts underneath it; and Fig. 3 is a vertical central section in the plane of the line 3 3 of Fig. 1.

The traction-wheel is denoted by A and preferably consists of a suitable annular rim $a$, having a tire $a'$ upon its outer wall, the inner wall of the said rim being convex in cross-section for receiving and retaining the two wheels of the bicycle and retaining-wheels, to be hereinafter described.

The bicycle, which is mounted within the traction-wheel A, comprises a suitable frame B, which connects a pair of wheels C C', the wheel C in the present instance being the driving-wheel of the bicycle. The frame B has a suitable seat-post tube $b$, within which a saddle-post $b'$, carrying the saddle $b^2$, is capable of being adjusted upwardly and downwardly.

The bottom bracket of the frame B is denoted by $b^3$, within which is mounted a crank-shaft D, carrying a driving-sprocket $d$, which driving-sprocket is connected with a rear sprocket $c$ upon the hub of the driving-wheel C by means of a suitable sprocket-chain $d'$.

A front tubular brace $b^4$ extends forwardly from the seat-post tube $b$ for a short distance and then upwardly to a point in about a horizontal line with the center of the traction-wheel A. This front brace $b^4$ is provided with a suitable handle $b^5$, adapted to be grasped by the rider when seated upon the saddle $b^2$.

A guide or retaining wheel E is carried by the upper end of the front brace $b^4$ and engages the inner wall of the traction-wheel A. The wheel E is adjusted toward and away from the top of the brace $b^4$ for accurately adjusting the amount of pressure of the said wheel E against the inner wall of the rim $a$ to hold the bicycle against rattling in its position within the traction-wheel A.

A rear-brace tube $b^6$ extends rearwardly from the seat-post tube $b$, and thence upwardly to a point at or near the horizontal plane of the center of the traction-wheel A, at which point the said rear brace is provided with a suitable guide-wheel E', which is adapted to travel along the inner wall of the rim $a$.

The two guide-wheels E E', together with the wheels C C' of the bicycle, serve to retain the bicycle in position within the traction-wheel A, the wheels C C' remaining at all times at or near the bottom of the traction-wheel.

The traction-wheel A is supported in a vertical position and also guided in its movement in the following manner:

A suitable elevated support or girder F extends along in the direction which it is desired that the cycle should be caused to travel, and the said girder supports a suitable track G by means of suitable hangers $f$, located at intervals along the same.

A pair of track-wheels H H' are mounted in the upper ends of suitable arms I I', which arms also carry a pair of guide-wheels J J', which are adapted to travel along the inner wall of the traction-wheel A at or near its top. The arms I I' are extended, as shown at $i\ i'$, downwardly into engagement with the guide-wheels E E', respectively, whereby the several wheels which engage the inner wall of the traction-wheel A are spaced apart around the same and are also rigidly spaced from the pair of track-wheels H H'. The arms I I' are rigidly spaced apart by means of a connecting-bar K.

All of the guide-wheels above mentioned are grooved or flanged, so as to prevent them from being unintentionally removed from their engagement with the traction-wheel, and the track-wheels H H' are also flanged or grooved, so as to prevent them from jumping the track G.

In the structure, as above described, the cycle is guided and also supported in an upright position, so that it requires no balancing on the part of the rider to drive the cycle. Furthermore, the structure, as above set forth, is very rigid and yet simple, thereby permitting the cycle to be driven with ease. Furthermore, because of the adjustment of one of the guide-wheels E E'—in the present instance the guide-wheel E—the bicycle may be accurately adjusted in its position upon the rim of the traction-wheel A, so as to prevent any undue rattling or any liability of the several wheels to jump off of the said traction-wheel. Again, by rigidly connecting the track-wheels H H' the top guide-wheels J J' and the central guide-wheels E E' together the bicycle is held at all times in the proper position at the bottom of the traction-wheel.

It is evident that slight changes might be resorted to in the form, construction, and arrangement of the several parts without departing from the spirit and scope of my invention. Hence I do not wish to limit myself strictly to the structure herein set forth; but

What I claim is—

1. In combination a traction-wheel, a bicycle mounted to travel along the inner wall of its rim, guide-wheels carried by the bicycle, a track located above the traction-wheel and track-wheels connected to the guide-wheels carried by the bicycle for supporting the traction-wheel in its upright position and guiding its movement, substantially as set forth.

2. In combination, a traction-wheel, a bicycle adapted to travel along its rim, a pair of guide-wheels carried by the bicycle, a second pair of guide-wheels located above the first-named guide-wheels and connected thereto, a pair of track-wheels connected to the guide-wheels and a track for supporting the track-wheels and thereby the traction-wheel for guiding the said traction-wheel in its movement, substantially as set forth.

3. In combination, a traction-wheel, a bicycle adapted to travel along its rim, a pair of guide-wheels carried by the bicycle for supporting it in position within the traction-wheel and means for adjusting one of the guide-wheels toward and away from the bicycle, substantially as set forth.

4. In combination, a traction-wheel, a bicycle adapted to travel along its rim, guide-wheels carried by the bicycle, a pair of arms extended upwardly from the guide-wheel supports, a connecting-bar for rigidly spacing the upper ends of the said arms apart, a pair of track-wheels mounted in said arms, a second pair of guide-wheels mounted in said arms and a track for supporting the track-wheels and thereby the traction-wheel and serving to guide it in its movement, substantially as set forth.

SAMUEL E. FRENCH.

Witnesses:
FREDK. HAYNES,
EDWARD VIESER.